United States Patent
Leung et al.

(10) Patent No.: US 6,636,846 B1
(45) Date of Patent: Oct. 21, 2003

(54) METHOD FOR PROVIDING A SYSTEM MAINTAINED MATERIALIZED FUNCTIONALLY DEPENDENT COLUMN FOR A DATABASE MANAGEMENT SYSTEM

(75) Inventors: Ting Yu Leung, San Jose, CA (US); Serge P. Rielau, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,633

(22) Filed: Apr. 28, 2000

(51) Int. Cl.⁷ .............................................. G06F 17/30
(52) U.S. Cl. ......................... 707/2; 707/3; 707/104; 707/200
(58) Field of Search ........................ 707/2, 3, 102, 707/104, 10, 200

(56) References Cited

U.S. PATENT DOCUMENTS

| | | | | |
|---|---|---|---|---|
| 5,535,385 A | * | 7/1996 | Griffin et al. ................... | 707/3 |
| 5,761,653 A | * | 6/1998 | Schiefer et al. ................. | 707/2 |
| 5,897,632 A | * | 4/1999 | Dar et al. ........................ | 707/1 |
| 5,930,795 A | * | 7/1999 | Chen et al. ................... | 707/100 |
| 5,991,754 A | | 11/1999 | Raitto et al. | |
| 6,006,216 A | * | 12/1999 | Griffin et al. ............ | 707/104.1 |
| 6,018,742 A | | 1/2000 | Herbert, III | |
| 6,081,801 A | * | 6/2000 | Cochrane et al. ............... | 707/3 |
| 6,199,063 B1 | * | 3/2001 | Colby et al. ................. | 707/102 |

* cited by examiner

Primary Examiner—Jean M. Corrielus
(74) Attorney, Agent, or Firm—Sawyer Law Group LLP

(57) ABSTRACT

A mechanism for supporting generated materialized columns without explicitly adding triggers and a check constraint in a database management system (DBMS). When a column affecting the generated materialized column is updated, a "before-update" trigger is internally generated in the DBMS and added as the last trigger before the update occurs. Similarly, when an insert operation is performed, a "before-insert" trigger is generated internally by the DBMS and added as the last trigger before the insert operation occurs. Since the triggers are generated internally in the DBMS, a constraint is not needed for either the update or the insert operations.

12 Claims, 3 Drawing Sheets

METHOD FOR PROVIDING A SYSTEM MAINTAINED MATERIALIZED FUNCTIONALLY DEPENDENT COLUMN FOR A DATABASE MANAGEMENT SYSTEM

FIELD OF THE INVENTION

The present invention relates to database management systems and more particularly to a method for a system maintained materialized functionally dependent generated column for a relational database management system (DBMS).

BACKGROUND OF THE INVENTION

A database management system (DBMS) comprises the combination of an appropriate computer, direct access storage devices (DASD) or disk drives, and database management software. A relational database management system is a DBMS which uses relational techniques for storing and retrieving information. The relational database management system or DBMS comprises computerized information storage and retrieval systems in which data is stored on disk drives or DASD for semi-permanent storage. The data is stored in the form of tables which comprise rows and columns. Each row or tuple has one or more columns.

The DBMS is designed to accept commands to store, retrieve, and delete data. One widely used and well known set of commands is based on the Structured Query Language or SQL. The term query refers to a set of commands in SQL for retrieving data from the DBMS. The definitions of SQL provide that a DBMS should respond to a particular query with a particular set of data given a specified database content. SQL however does not specify the actual method to find the requested information in the tables on the disk drives. There are many ways in which a query can be processed and each consumes a different amount of processor and input/output access time. The method in which the query is processed, i.e. query execution plan, affects the overall time for retrieving the data. The time taken to retrieve data can be critical to the operation of the database. It is therefore important to select a method for finding the data requested in a query which minimizes the computer and disk access time, and therefore, optimizing the cost of doing the query.

A database system user retrieves data from the database by entering requests or queries into the database. The DBMS interprets the user's query and then determines how best to go about retrieving the requested data. In order to achieve this, the DBMS has a component called the query optimizer. The DBMS uses the query optimizer to analyze how to best conduct the user's query of the database with optimum speed in accessing the database being the primary factor. The query optimizer takes the query and generates a query execution plan. The query execution plan comprises a translation of the user's SQL commands in terms of the DBMS operators. There may be several alternative query execution plans generated by the query optimizer, each specifying a set of operations to be executed by the DBMS. The many query execution plans generated for a single query ultimately differ in their total cost of obtaining the desired data. The query optimizer then evaluates these cost estimates for each query execution plan in order to determine which plan has the lowest execution cost. In order to determine a query execution plan with the lowest execution cost, the query optimizer uses specific combinations of operations to collect and retrieve the desired data. When a query execution plan is finally selected and executed, the data requested by the user is retrieved according to that specific query execution plan however manipulated or rearranged.

In a SQL based DBMS the query execution plan comprises a set of primitive operations or commands, e.g. JOIN; a sequence in which the retrieve operations will be executed, e.g. JOIN ORDER; a specific method for performing the operation, e.g. SORT-MERGE JOIN; or an access method to obtain records from the base relations, e.g. INDEX SCAN. In most database systems, particularly large institutional systems, a cost-based query optimizer will be utilized. A cost-based query optimizer uses estimates of I/O and CPU resource consumption in determining the most efficient query execution plan because both I/O and CPU resource consumption depend on the number of rows that need to be processed.

The performance of queries against a database may be enhanced significantly by materializing certain data that may be redundant of data already in the database. This materialized data may be organized in ways better suited to certain database operations, such as searching for specific data, for example as with indexes, or may pre-compute information likely to be asked for often, as with materialized views, for example.

A materialized generated column in the DB2™ software product is a column of a table which is functionally dependent on other columns in the same row. In general it is not advisable to have functionally dependent columns in a table since there is a risk to the integrity of the database if the functionally dependent columns are not maintained properly. However in the art, functionally dependent columns have advantages in certain situations, including the following: (a) The expression for deriving the value of the generated column is expensive and therefore causes a performance hit for all queries requiring the result if evaluated at query time. For example, the source column is a large object and the expression extracts meta-information of that object such as the minimum bounding rectangle of a complex shape. (b) In another situation, the column value may be needed for indexing or partitioning of the table. For example, the source column is a customer name, but an index is needed on the case-insensitive version of the name.

The conventional way for maintaining such a materialized generated column involves creating two triggers and a check constraint. One "before-each-row-insert" trigger is utilized to populate the generated column when a new row is inserted. Another "before-each-row-update" trigger is utilized to maintain the column whenever a value on which the generated column depends on is changed. The check constraint is used to ensure the integrity of the generated column even when triggers are not fired, for example, when there is a bulk load of new data. The check constraint is also important to allow the DBMS to exploit the knowledge of the functional dependency. For example, when a query uses the same expression that is used to define the additional column, the expression car be re-routed to that column. This allows existing applications to benefit from the column without knowing about its existence.

Creating a generated column using conventional SQL techniques has several drawbacks. First, the procedure is awkward and requires the creation of multiple supporting objects. Secondly, for an UPDATE or DELETE operation, the generating expression has to be evaluated twice. One evaluation is for the trigger and the other evaluation is to ensure the integrity via the check constraint. Thirdly, triggers fire in a certain order. In order to ensure the integrity of the generated column, the trigger maintaining the generated column has to be fired last at all times.

Accordingly, there remains a need for a mechanism which provides the advantages of functionally dependent columns without the drawbacks associated with prior approaches.

BRIEF SUMMARY OF THE INVENTION

The present invention is directed to a method for providing a functionally dependent column or materialized generated column for a relational database management system (RDBMS) which is maintained by the system. The generated column is a column in a table of an RBDMS which is functionally dependent on other columns in the same table. The integrity of the generated column is maintained and ensured by the DBMS transparently to the user.

According to one aspect of the invention, whenever a column affecting a generated column is updated a before-update trigger is internally generated and added as the last trigger before the update occurs. Whenever an insert operation is performed, a before insert trigger is internally generated and added as the last trigger before the insert occurs. This feature makes it possible to ensure integrity without checking the value and also enables the optimizer to take advantage of the generated column expression.

According to another aspect, a syntax to define the column and generate its expressions is provided. This provides greater flexibility in the application of the materialized generated column, and also enables the DBMS to optimize the maintenance of the generated column which results in better performance.

In a first aspect, the present invention provides a method for maintaining a materialized column in a database management system, the materialized column s dependent on one or more columns appearing in one or more tables stored in the database management system, each of the tables is organized as a plurality of rows and columns, and the database management system provides a preprocessing module for use in the processing of data for the table, the method comprises the steps of: (a) generating an internal object in response to one of the rows in the table being modified, wherein the row includes one or more of the dependent columns; (b) executing the internally generated object in the preprocessing module after all preprocessing operations for manipulating the columns upon which the generated object depends have seen performed.

In another aspect, the present invention provides a computer program product for use on a computer for maintaining a materialized column in a database management system, the database management system including a processing unit and physical storage for storing data, the physical storage being operatively connected to the processing unit, the physical storage containing one or more tables, each database table being organized as a plurality of rows and columns, the materialized column is dependent on one or more columns in the table, and wherein commands are entered by a user for inserting and modifying data in the database management system, the computer program product comprises: a recording medium; means recorded on the medium for instructing the processing unit to perform the steps of, (a) generating an internal object in response to one of the rows in the table being modified, wherein the row includes one or more of the dependent columns; (b) executing the internally generated object in a preprocessing module after all preprocessing operations for manipulating the columns upon which the generated object depends have been performed.

In yet another aspect, the present invention provides a computer program product for use on a computer for maintaining a materialized column in a database management system, the database management system includes a processing unit and physical storage for storing data, the physical storage is operatively connected to the processing unit, the physical storage contains one or more tables, each database table is organized as a plurality of rows and columns, the materialized column is dependent on one or more columns in the table, and wherein commands are entered by a user for inserting and modifying data in the database management system, the computer program product comprises: a recording medium; means recorded on the medium for instructing the processing unit to perform the steps of, (a) generating an internal object in response to one of the rows in the table being modified, wherein the row includes one or more of the dependent columns; (b) if the modification to the row comprises an update operation, the internally generated object is included in a before-trigger list as a before-trigger, and the internally generated object is added as the last before-trigger to the before-trigger list; and (c) processing the internally generated before-trigger before the row is modified.

BRIEF DESCRIPTION OF THE DRAWINGS

Reference will now be made to the accompanying drawings which show, by way of example, preferred embodiments of the present invention and in which.

DETAILED DESCRIPTION OF THE PREFERRED EMBODIMENT

According to one aspect of the invention, a mechanism is provided for defining a materialized and functionally dependent column or columns. For example, in an implementation for the DB2™ database product, a generated (i.e. materialized and functionally dependent) column denoted as g1 is defined as follows:

CREATE TABLE T(c1 INT, c2 INT, g1 INT GENERATED ALWAYS AS (c1+c2));

As indicated, generated column g1 is functionally dependent on columns c1 and c2.

According to this aspect, whenever a column affecting the generated column g1 is updated (i.e. in response to the UPDATE statement in SQL), then a "before-update" trigger is internally generated for the DB2 database management system (DBMS) program and added as the last trigger before the update occurs. Whenever an insert (i.e. INSERT statement in SQL) is performed a "before-insert" trigger is internally generated and added as the last trigger before the insert occurs. It will be appreciated that no constraint needs to be added in either case, since the database management system (DBMS) will know that a trigger has been added to maintain the generated column g1. In cases of a bulk load and for queries, the generated column g1 will appear as a column with a check constraint. This allows for integrity checking on the value and it enables the optimizer to take advantage of the generated column expression. The actual implementation of the "before-update" and "before-insert" triggers in the DB2™ product, for example, is within the understanding of those skilled in the art, and is described in more detail below.

Figure 1:
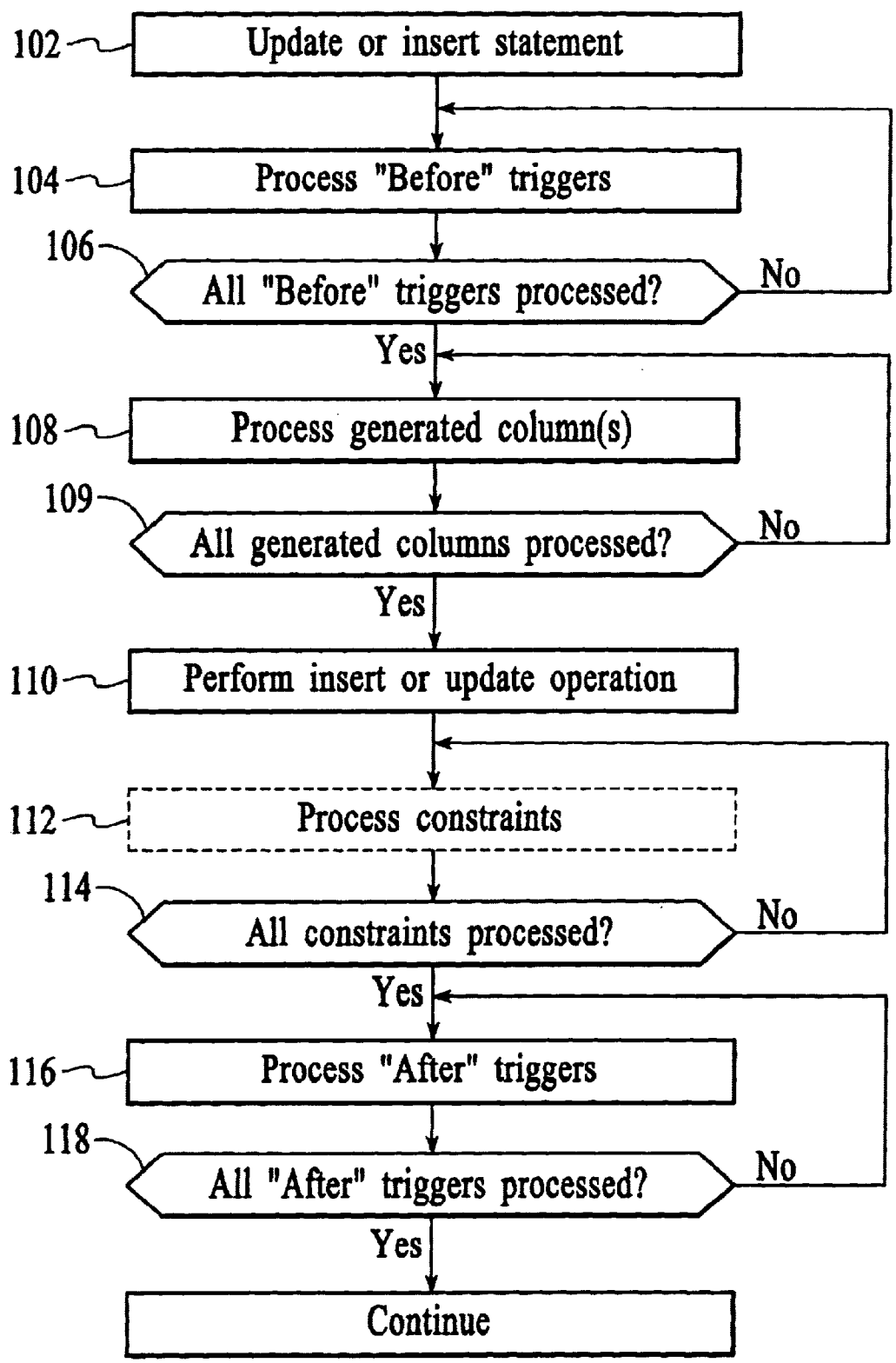
FIG. 1 shows in flow chart a method for a system maintained materialized functionally dependent column for a database management system according to he present invention.

Reference is next made to FIG. 1 which shows in flow chart form a method for providing a system maintained materialized functionally dependent column (i.e. column g1) for a database management system in accordance with the present invention. The method denoted generally by reference 100 shows the steps for semantically processing an UPDATE or INSERT operation using the SQL standard in a Relational Database Management System (DBMS).

As shown in FIG. 1, the UPDATE or INSERT statement is depicted in block 102. In SQL, the INSERT operation involves collecting the rows to be inserted in a table, and the UPDATE operation involves updating selected rows in a table as seen by the user. The next step as shown in block 104 involves processing the "Before" triggers. Before triggers can modify the data before it is written to a storage device (i.e. stored in the database). It is possible to have multiple "before" triggers and these triggers are processed in a specified order at this stage. For example, in the DB2™ database product, multiple triggers are "fired", i.e. processed, in the order of creation time, i.e. first older triggers, then younger triggers. After all of the before triggers are processed as determined in decision block 106, the next step involves processing the generated column in block 108.

In step 108, the generated materialized functionally dependent column defined according to the present invention is processed. If there are multiple generated columns and the columns are dependent on each other, then the columns are processed in order of dependency. The processing is repeated until all of the generated materialized functionally dependent columns are processed (decision block 109).

The next step as shown in block 110 of FIG. 1 involves performing the actual update or insert operation by writing the data to the storage device. Next in block 112, the integrity of the data written to the storage device is checked for selected situations. The processing of the check constraint incarnation is suppressed in block 112 if the before-trigger incarnation (block 104) is utilized as will be described in more detail below. If the data written to the storage device does not satisfy the constraints (i.e. integrity requirements), then the changes made to the database in block 110 are undone and the UPDATE or INSERT statement (block 102) fails. Once all the constraints have been successfully processed, the "after-triggers" are processed in block 116. The after-triggers comprise subsequent changes to the database as a result of performing the UPDATE or INSERT operation in block 110. For example, an after-trigger may comprise the modification of additional tables in the database. Like the before-triggers, there may be multiple after-triggers. Multiple triggers (decision block 118) may be processed as described above The operation of the mechanism for a materialized and functionally dependent column or columns according to the present invention is now described in more detail with reference to the following example:

CREATE TABLE emp
(name VARCHAR (10),
salary INTEGER NOT NULL,
bonus INTEGER NOT NULL,
total_comp INTEGER NOT NULL GENERATED
  ALWAYS AS (salary+bonus));

In this example, the generated materialized column comprises the column total_comp which is dependent on the two columns salary and bonus.

In this example, an incentive is included in the form of a 10% increase in the bonus of new hires. The incentive column is defined as a trigger as follows:

CREATE TRIGGER incentive NO CASCADE BEFORE
  INSERT ON emp REFERENCING NEW AS newrow
  FOR EACH ROW MODE DB2SQL SET
  newrow.bonus=newrow.bonus *1.1;

The addition of a new employee 'Smith' with a starting salary of $60,000 and a bonus of $10,000 is defined in SQL as follows:

ASSERT INTO emp(name, salary bonus)
VALUES('Smith', 60000, 10000);

Internally in the DIMS, a corresponding object, i.e. ASSIGN CONSTRAINT and CHECK CONSTRAINT, is generated and defined as follows:

ALTER TABLE emp ADD ASSIGN CONSTRAINT
  set_total_comp SET AND CHECK total_comp=
  (salary+bonus)

The assign constraint set_total_comp is utilized as a before-update trigger in the case of a subsequent UPDATE operation, as a before-insert trigger in the case of a subsequent INSERT operation. The assign constraint total_comp is utilized as a check constraint in the case of query optimization or data load operations.

Reference is again made to the procedure 100 in FIG. 1 in conjunction with the following insert statement for inserting a new employee, 'Smith', into the table emp.

The first step in block 102 comprises the INSERT operation and involves inserting one new row for 'Smith' as follows:

newrow.name:='Smith'
newrow.salary:=60000
newrow.bonus:=10000

The second step in block 104 involves processing the before-insert triggers. For this example, the before-insert trigger comprises the 'incentive' trigger in the form of a bonus. The incentive before-insert trigger is fired in step 104 as follows;

newrow.bonus:=newrow.bonus=1.1:=11000

According to this aspect of the invention, the next step in block 108 involves processing the generated materialized column total_comp. As described above, the assign constraint set_total_comp functions as a before trigger for an INSERT operation. The before-insert trigger is fired in step 108 as follows:

newrow.total_comp;=newrow.salary+newrow.bonus:=
  71000

The next step in block 110 comprises executing the insert operation by writing the data, i.e. 'Smith' (name), '60000' (salary), '10000' (bonus), and '71000' (total compensation), to the storage device for the DBMS. The storage of the new row of data for employee 'Smith' in the table emp in step 110 is denoted as follows:

newrow->emp

The next step in blocks 112 and 114 comprises processing the constraints to ensure the integrity of the data written to the database. According to this aspect of the invention, the processing of the check constraint incarnation of set_total_comp in step 112 is suppressed since its before-trigger incarnation in step 108 was utilized. In this example, the before-trigger set_total_comp was fired in step 108, and the DBMS will know that the check constraint total_comp follows from the operation in step 108, and therefore it is not necessary to process an additional constraint in step 112. The next step in blocks 116 and 118 comprises processing ("firing") the after-triggers. The above example of employee 'Smith' does not include any after triggers.

Figure 2:
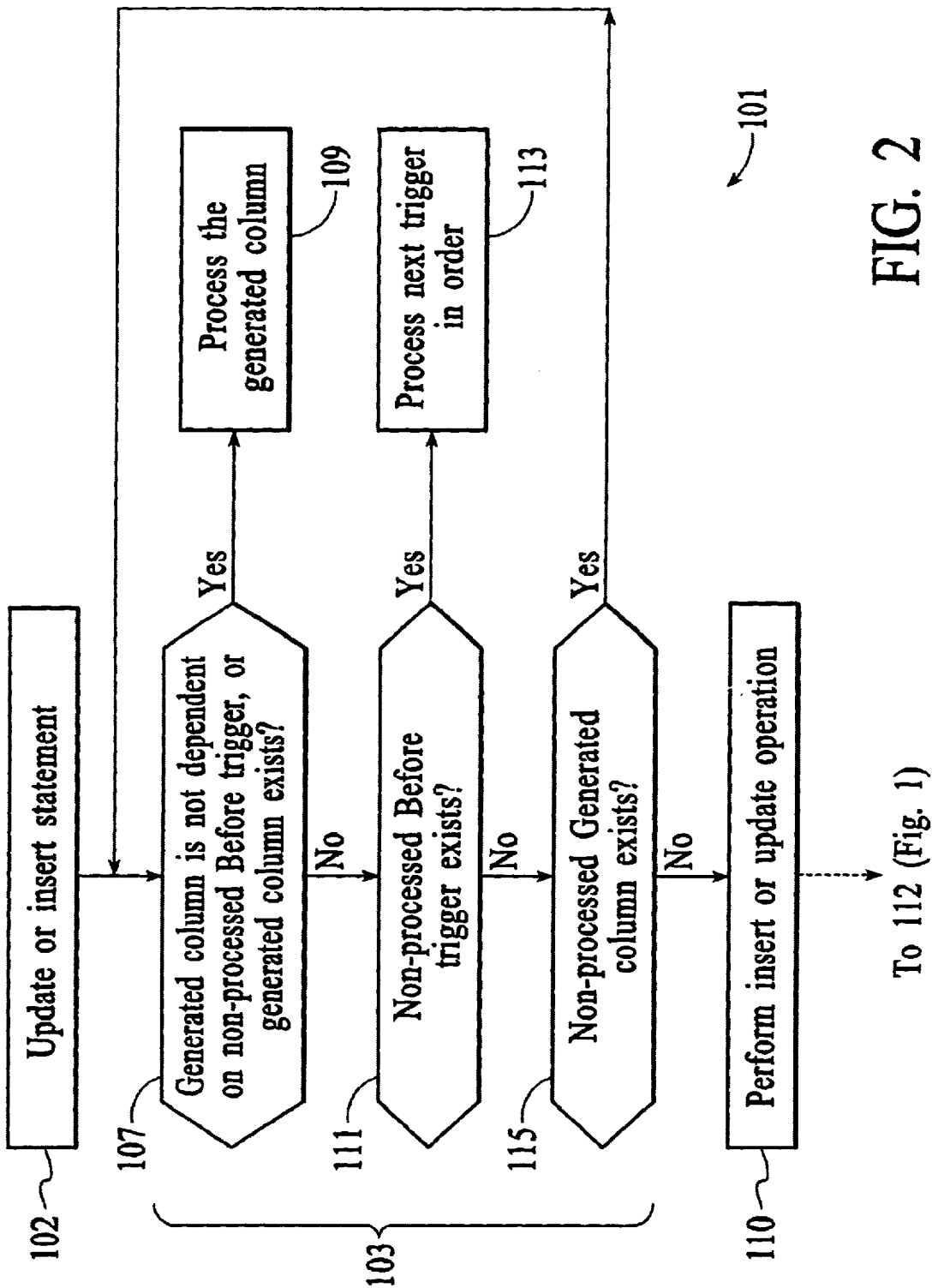
FIG. 2 shows in flow chart another embodiment of the method for a system maintained materialized functionally dependent column for a database management system according to the present invention.

According to another embodiment, the processing of the before triggers (block 106) and the processing of the generated column (block 108) steps are replaced by a preprocessing module 103 as shown in FIG. 2 and indicated generally by reference 101. As shown in FIG. 2, after collecting the rows to be updated/inserted (block 102), the before triggers and generated columns are processed in block 105 and the preprocessing module 103. The first step (block 107) in the preprocessing module 103 involves determining if the generated column is independent of the before triggers which haven't been processed. If yes, then the generated column can be processed ahead of the before-triggers in block 109. If the generated column is not independent of the unprocessed before-triggers, then a check is made in block 111 to determine if any unprocessed before-triggers exist. If yes, then the unprocessed before-trigger is processed in block 113. This procedure (blocks 107, 111, 113) is repeated until all the unprocessed before-triggers have been processed. Next, a check is made in block 115 to determine if any unprocessed generated columns exist. If yes, the unprocessed generated column is processed in block 109. After the preprocessing module 103, the next step is performing the insert or update operation in block 110 as described above with reference to FIG. 1.

Figure 3:
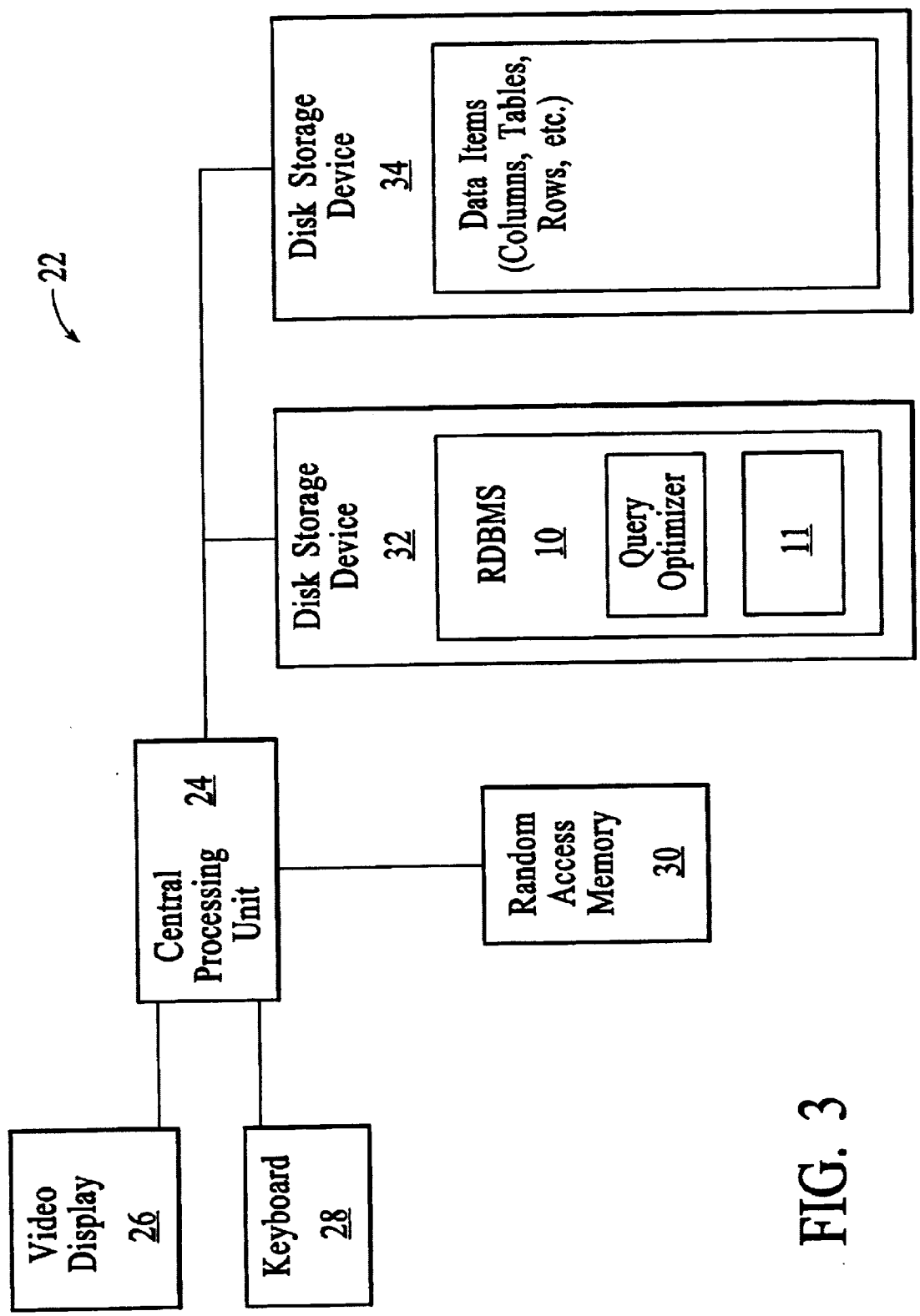
FIG. 3 is a block diagram showing a data processing system employing the present invention.

Reference is next made to FIG. 3 which shows a data processing system 22 incorporating the present invention. The data processing system 22 comprises a central processing unit 24, a video display 26, a keyboard 28, random access memory 30 and one or more disk storage devices 32. One skilled in the art will recognize the data processing system 22 a conventional general purpose digital computer. In FIG. 2, the relational database management system 10 incorporating the present method comprises a software, i.e. preprocessing module 11 which is stored or loaded on the disk storage device 32. Data items, e.g. rows, columns, tables, etc. which are associated with the relational database management system 10 can be stored on the same disk 32 or on another disk 34.

Advantageously, native materialized generated columns according to the present invention offer the following benefits. Integrity is ensured as the problems with trigger ordering, dropped triggers, etc. are eliminated. Better performance is achieved because constraint checks at updates and inserts are suppressed.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for maintaining a materialized generated column in a database management system, said method, comprising the steps of:
 (a) generating an internal object in response to one of a plurality of rows in a table of a database being modified, the table including a materialized generated column, the materialized generated column being dependent on one or more dependent columns, wherein said row includes one or more of the dependent columns; and
 (b) executing said generated internal object in a preprocessing module of the database management system after all preprocessing operations for manipulating columns upon which said generated internal object depends have been performed.

2. The method as claimed in claim 1, wherein said step (b) further comprises
 executing said generated internal object in said preprocessing module, and said generated internal object being executed as a last preprocessing operation in said preprocessing module, and performing said last preprocessing operation before said row is modified.

3. The method as claimed in claim 2, further including the step of utilizing said generated internal object to suppress the performance of a check constraint associated with dependency of the materialized column.

4. The method as claimed in claim 2, further including the step of generating an internal object comprising a constraint in response to performance of an operation of one of a group comprising a query optimization and a data load operation.

5. The method as claimed in claim 2, wherein said reprocessing module comprises a before-trigger list.

6. The method as claimed in claim 5, wherein the modification comprises an insert operation, and said internal object generated in step (a) comprises a before-insert trigger.

7. The method as claimed in claim 5, wherein the modification comprises an update operation, and said internal object generated in step (a) comprises a before-update trigger.

8. A computer program product for use on a computer for maintaining a materialized generated column in a database management system, said computer program product comprising:
 a recording medium;
 means recorded on said recording medium for instructing a processing unit to perform the steps of,
  (a) generating an internal object in response to one of a plurality of rows in a table of a database being modified, the table including a materialized generated column, the materialized generated column being dependent on one or more dependent columns, wherein said row includes one or more of the dependent columns;
  (b) if the modification to said row comprises an update operation, said generated internal object is included in a before-trigger list as a before-trigger, and said generated internal object being added as the last before-trigger to the before-trigger list; and
  (c) processing said before-trigger before said row is modified.

9. The computer program product as claimed in claim 8, wherein if the modification to said row comprises an insert operation, said generated internal object is included in the before-trigger list as a before-trigger, and the generated internal object is added as the last before-trigger to the before-trigger list.

10. The computer program product as claimed in claim 8, further including the step of utilizing said before-trigger to suppress the performance of a check constraint associated with dependency of the materialized column.

11. The computer program product as claimed in claim 8, further including the step of generating an internal object comprising a constraint in response to performance of an operation of a group comprising a query optimization and a data load operation.

12. A computer program product for use on a computer for maintaining a materialized generated column in a database system, said computer program product comprising:

a recording medium;

means recorded on said medium for instructing a processing unit to perform the steps of, generating an internal object in response to one of a plurality of the rows in a table of a database being modified, the table including a materialized generated column, the materialized generated column being dependent on one or more dependent columns, wherein said row includes one or more of the dependent columns; and executing said generated internal object in a preprocessing module after all preprocessing operations for manipulating said columns upon which said generated internal object depends have been performed.

\* \* \* \* \*

UNITED STATES PATENT AND TRADEMARK OFFICE
CERTIFICATE OF CORRECTION

PATENT NO. : 6,636,846 B1
DATED : October 21, 2003
INVENTOR(S) : Tin Y. Leung et al.

It is certified that error appears in the above-identified patent and that said Letters Patent is hereby corrected as shown below:

<u>Title page,</u>
Item [75], Inventors, please add -- Mir Hamid Pirahesh, San Jose, CA (US) --.

Signed and Sealed this

Twenty-seventh Day of January, 2004

JON W. DUDAS
*Acting Director of the United States Patent and Trademark Office*